US012684119B2

(12) United States Patent　　　　(10) Patent No.:　　US 12,684,119 B2

Fernandes et al.　　　　　　　　　　(45) Date of Patent:　　　　Jul. 14, 2026

(54) SYSTEMS AND METHODS FOR LUMA OR CHROMA STATISTICS COLLECTION

(71) Applicant: Apple Inc., Cupertino, CA (US)

(72) Inventors: Felix C Fernandes, Saratoga, CA (US); Liviu R Morogan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 278 days.

(21) Appl. No.: 17/591,572

(22) Filed: Feb. 2, 2022

(65) Prior Publication Data

US 2023/0085391 A1　　Mar. 16, 2023

Related U.S. Application Data

(60) Provisional application No. 63/243,702, filed on Sep. 13, 2021.

(51) Int. Cl.

| | |
|---|---|
| *H04N 19/117* | (2014.01) |
| *G06T 5/40* | (2006.01) |
| *H04N 19/132* | (2014.01) |
| *H04N 19/186* | (2014.01) |
| *H04N 19/82* | (2014.01) |
| *H04N 19/86* | (2014.01) |

(52) U.S. Cl.

CPC ............. *H04N 19/117* (2014.11); *G06T 5/40* (2013.01); *H04N 19/132* (2014.11); *H04N 19/186* (2014.11); *H04N 19/82* (2014.11); *H04N 19/86* (2014.11); *G06T 2207/20076* (2013.01)

(58) Field of Classification Search

CPC ...... H04N 19/82; H04N 19/86; H04N 19/117; H04N 19/132; H04N 19/186

See application file for complete search history.

(56) References Cited

U.S. PATENT DOCUMENTS

| | | | | |
|---|---|---|---|---|
| 6,002,441 | A * | 12/1999 | Bheda | H04N 19/61 |
| | | | | 375/240.26 |
| 6,181,711 | B1 * | 1/2001 | Zhang | H04N 19/40 |
| | | | | 370/468 |
| 6,462,788 | B1 * | 10/2002 | Tan | H04N 9/646 |
| | | | | 348/E5.077 |
| 9,106,888 | B2 | 8/2015 | Chou | |
| 9,215,472 | B2 | 12/2015 | Orr et al. | |
| 9,218,639 | B2 | 12/2015 | Cote et al. | |
| 9,224,186 | B2 | 12/2015 | Rygh et al. | |
| 9,224,187 | B2 | 12/2015 | Cote et al. | |
| 9,270,999 | B2 | 2/2016 | Cote et al. | |
| 9,292,899 | B2 | 3/2016 | Schaub et al. | |
| 9,299,122 | B2 | 3/2016 | Okruhlica et al. | |
| 9,305,325 | B2 | 4/2016 | Cheng et al. | |
| 9,336,558 | B2 | 5/2016 | Cote et al. | |
| 9,351,003 | B2 | 5/2016 | Cote et al. | |
| 9,380,312 | B2 | 6/2016 | Cote et al. | |
| 2007/0237241 | A1 * | 10/2007 | Ha | H04N 19/117 |
| | | | | 375/E7.226 |

(Continued)

*Primary Examiner* — Dave Czekaj

*Assistant Examiner* — Shanika M Brumfield

(74) *Attorney, Agent, or Firm* — Fletcher Yoder, P.C.

(57)　　　　ABSTRACT

Systems and methods of analyzing the luma statistics or chroma statistics to correct for image artifacts in decoded images. Video decoder circuitry may enable luma statistics collection circuitry housed in the loop filters to collect luma samples during the last stage of the decoding process. This enables output of luma statistics data and output of the decoded image together.

20 Claims, 7 Drawing Sheets

(56)        References Cited

U.S. PATENT DOCUMENTS

| | | | |
|---|---|---|---|
| 2009/0238283 A1* | 9/2009 | Han | H04N 19/51 |
| | | | 375/E7.125 |
| 2010/0118204 A1 | 5/2010 | Proca et al. | |
| 2011/0090309 A1* | 4/2011 | Suzuki | H04N 19/597 |
| | | | 348/51 |
| 2014/0294094 A1* | 10/2014 | Wu | H04N 21/84 |
| | | | 375/240.26 |
| 2015/0092833 A1 | 4/2015 | Ku et al. | |
| 2015/0092843 A1* | 4/2015 | Millet | H04N 19/423 |
| | | | 375/240.12 |
| 2015/0092855 A1 | 4/2015 | Chou et al. | |
| 2015/0373368 A1* | 12/2015 | Jeong | H04N 19/573 |
| | | | 375/240.12 |
| 2016/0007038 A1 | 1/2016 | Chou et al. | |
| 2016/0021385 A1 | 1/2016 | Chou et al. | |
| 2016/0065969 A1 | 3/2016 | Cheng et al. | |
| 2016/0065973 A1 | 3/2016 | Cote et al. | |
| 2018/0220101 A1* | 8/2018 | Evans | G09G 5/02 |
| 2018/0359410 A1 | 12/2018 | Ain-Kedem et al. | |
| 2019/0156516 A1 | 5/2019 | Nikkanen et al. | |
| 2019/0373258 A1* | 12/2019 | Karczewicz | H04N 19/70 |
| 2021/0329158 A1* | 10/2021 | Ichikawa | H04N 23/675 |
| 2022/0108429 A1* | 4/2022 | Li | G06T 5/009 |
| 2024/0203090 A1* | 6/2024 | Morishita | G09G 5/36 |

* cited by examiner

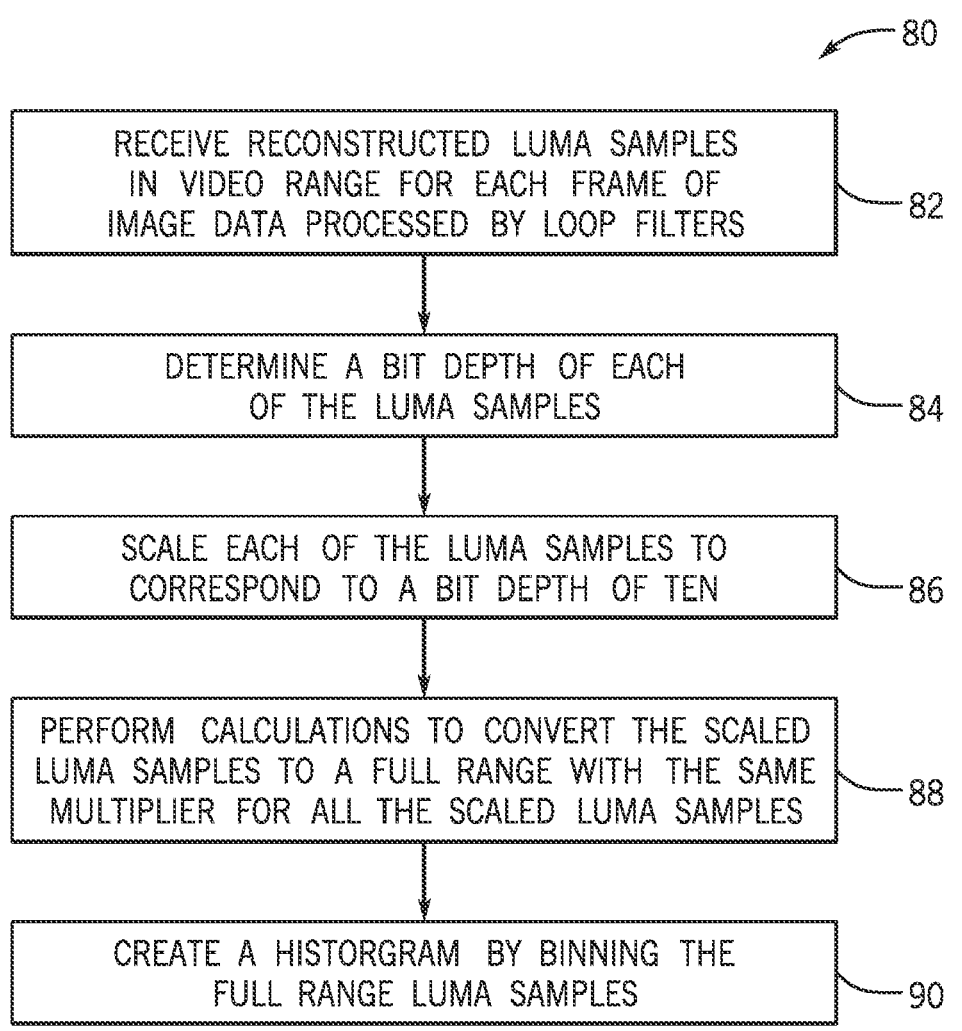

80

RECEIVE RECONSTRUCTED LUMA SAMPLES
IN VIDEO RANGE FOR EACH FRAME OF
IMAGE DATA PROCESSED BY LOOP FILTERS

82

DETERMINE A BIT DEPTH OF EACH
OF THE LUMA SAMPLES

84

SCALE EACH OF THE LUMA SAMPLES TO
CORRESPOND TO A BIT DEPTH OF TEN

86

PERFORM CALCULATIONS TO CONVERT THE SCALED
LUMA SAMPLES TO A FULL RANGE WITH THE SAME
MULTIPLIER FOR ALL THE SCALED LUMA SAMPLES

88

CREATE A HISTORGRAM BY BINNING THE
FULL RANGE LUMA SAMPLES

SYSTEMS AND METHODS FOR LUMA OR CHROMA STATISTICS COLLECTION

CROSS-REFERENCE TO RELATED APPLICATIONS

This application claims priority to U.S. Provisional Application No. 63/243,702, entitled, "Systems and Methods for Luma Statistics Collection," filed Sep. 13, 2021, the disclosure of which is incorporated by reference in its entirety for all purposes.

BACKGROUND

This disclosure relates to systems and methods of luma statistics collection and luma statistics analysis during the image decoding process.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Numerous electronic devices—such as cellular devices, televisions, handheld devices, and notebook computers—often display images and videos on an electronic display. To do this efficiently, many electronic devices include image decoding circuitry that parses and processes encoded video data to produce decoded video frames. As images and videos gain increasing resolution and dynamic range, the sizes of encoded bitstreams have also grown, which places an increasing burden on the image decoding circuitry.

SUMMARY

A summary of certain embodiments disclosed herein is set forth below. It should be understood that these aspects are presented to provide the reader with a brief summary of these certain embodiments and that these aspects are not intended to limit the scope of this disclosure.

Video content received for decoding, specifically high dynamic range (HDR) content, may suffer from image artifacts resulting from the decoding process. To mitigate the image artifacts that may result from decoding HDR content, video decoder circuitry may implement luma statistics collection. The video decoder circuitry may collect and analyze the luma statistics, to enable image artifact correction and tone mapping for the decoded images. Luma statistics may be collected by implementing a variety of methods. Luma statistics may be collected when the decoded frames are output from the video decoder in one pass, and a second pass may be applied to the decoded frames to use the collected luma statistics to correct for image artifacts. However, this two-pass method may introduce latency into the decoding process. Luma statistics may also be collected for one frame of image data and applied to correct proceeding frames of image data. However, because image frame data may be variable from one frame to the next depending on scene changes, this method may result in further image artifacts in some cases.

Thus, embodiments herein provide various systems and methods to reduce latency and inefficiencies in applying luma statistics to correct for image artifacts in decoded image frame data. To do so, embodiments disclosed herein include luma statistics collection circuitry that is disposed within loop filters hardware of the video decoder. This enables the video decoder to collect luma statistics for a current frame, and output the current frame and the luma statistics corresponding to the current frame together to eliminate frame delays and inefficiencies in luma statistic collection. This method enables luma statistics collected during the last stage of the image decoding process (e.g., loop filters, deblocking) to be output along with the decoded image frame. The luma statistics may be applied to the image frame to enable image artifact correction for the decoded image frame.

Additionally, multiple methods of luma statistic collection and analysis may be implemented by the luma statistic collection circuitry disposed within the loop filter hardware. In some embodiments, the luma samples may be converted from a sample range corresponding to a video range (e.g., $[16*2^n-8, 235*2^n-8]$, n=bit depth) to a full range (e.g., values $[0, 2^n-1]$, n=bit depth) corresponding to a Region of Interest (ROI) of an image frame. The luma samples may be converted using multiple conversion methods. The methods of luma sample conversion may use multiple multipliers or implement a single multiplier to convert the luma samples from a video range to a full range. To compute the histogram, full range luma samples may be binned across the entire image frame. Certain low-complexity conversion methods may be implemented to reduce binning mismatches that may occur relative to floating-point conversion of the luma samples to the full range output. The luma samples may be used to compute a histogram of reconstructed luma samples for each frame, so that image corrections may be performed based on the resulting histogram data.

BRIEF DESCRIPTION OF THE DRAWINGS

Various aspects of this disclosure may be better understood upon reading the following detailed description and upon reference to the drawings described below.

FIG. 8 is a flowchart of a method of luma sample conversion from video range to full range using a single multiplier for each luma sample bit depth; and

DETAILED DESCRIPTION

Figure 1:
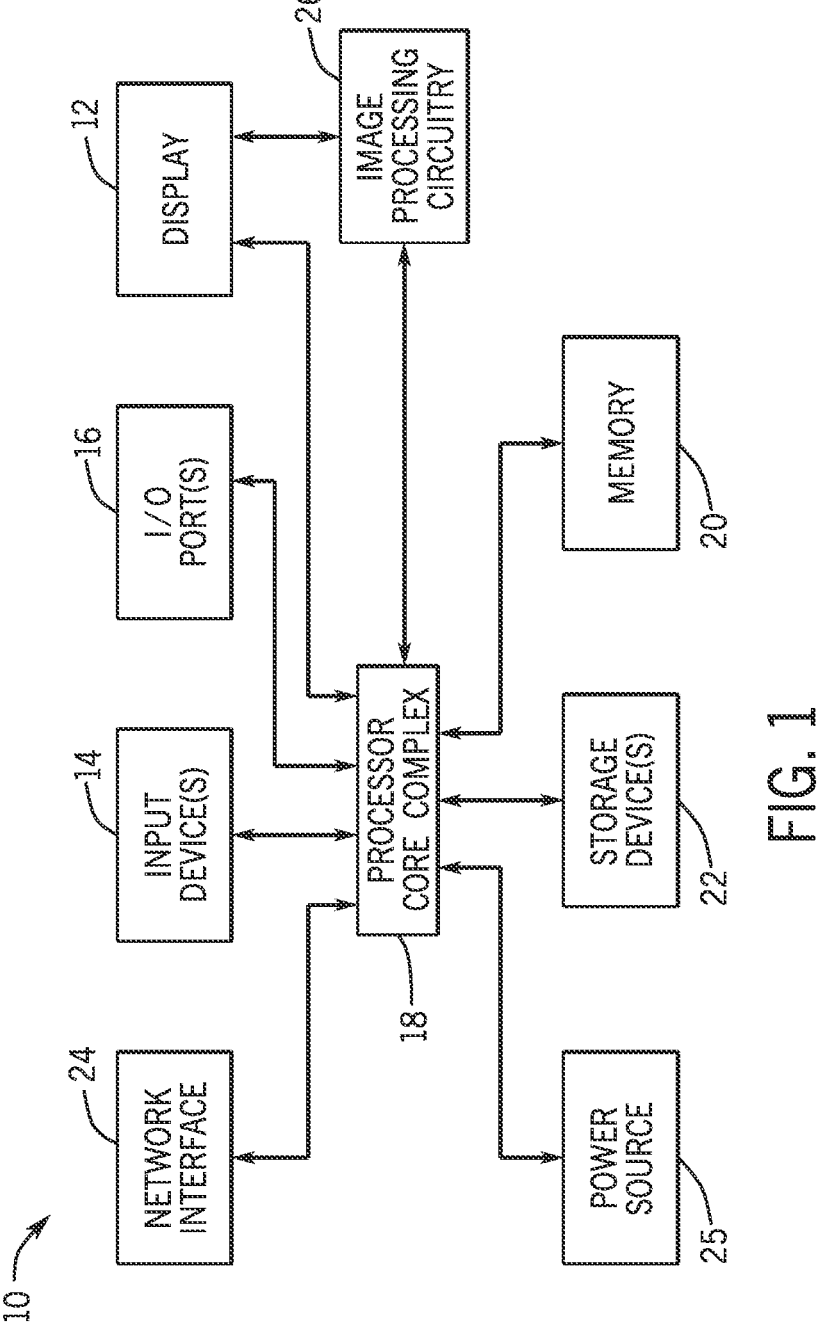
FIG. 1 is a schematic block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

This disclosure relates to luma statistic collection via video decoder circuitry to correct for image artifacts in decoded image frames. Luma statistics may be collected at the output of decoded image frames via video decoder circuitry. Some luma statistic collection may involve a first pass via the video decoder circuitry that collects the luma statistics, and a second pass which applies the luma statistics to the frame. This two-pass method of luma statistic collection may result in excess power and memory usage. Additionally, the video decoder circuitry may generate a histogram based on luma statistics from a previous frame, and apply the same luma statistics to subsequent frames. This method may result in excess image artifacts due to variability in frames. To mitigate these issues, luma statistic collection may be included in the loop filters component of the video decoder, and the video decoder may output the luma statistics with the corresponding decoded frame to reduce latencies and processing power related to luma statistic collection.

Embodiments herein provide various systems and methods to reduce latency and inefficiencies in luma statistics collection. To do so, embodiments disclosed herein include luma statistics collection circuitry disposed within loop filters hardware of the video decoder. This enables the video decoder to collect luma statistics for a current frame and output the current frame and the luma statistics together. This method of outputting luma statistic data with frame data may eliminate frame delays and inefficiencies in luma statistic collection. This method enables luma statistics to be collected during the last stage of the image decoding process (e.g., loop filters, deblocking), and be output along with the decoded image frame to enable image artifact correction for the decoded image frame.

Additionally, multiple methods of luma statistic collection and analysis may be implemented by the luma statistics collection circuitry disposed within the loop filters hardware. In some embodiments, the luma samples collected by the luma statistics collection circuitry may be converted from a sample video range (e.g., $[16*2^{n-8}, 235*2^{n-8}]$, n=bit depth) to a full range (e.g., values $[0, 2^{n}-1]$, n=bit depth) corresponding to a frame Region of Interest (ROI). The luma samples may be converted using multiple conversion methods. The methods of luma sample conversion may use multiple multipliers or implement a single multiplier to convert the luma samples from a video range to a full range. To compute the histogram, full range luma samples may be binned across the entire image frame. Certain conversion methods may be implemented to reduce binning mismatches that may occur relative to floating-point conversion of the luma samples to the full range output. The converted luma samples may be used to compute a histogram of reconstructed luma statistics for each frame, so that image corrections may be performed based on the resulting histogram data. Although luma statistics collection is discussed above, the same methods may be applied to conduct chroma statistics collection on the image frame.

With this in mind, an example of an electronic device 10 that may benefit from these features is shown in FIG. 1. The electronic device 10 may be any suitable electronic device, such as a computer, a mobile (e.g., portable) phone, a portable media device, a tablet device, a television, a hand-held game platform, a personal data organizer, a virtual-reality headset, a mixed-reality headset, a vehicle dashboard, and/or the like. Thus, it should be noted that FIG. 1 is merely one example of a particular implementation and is intended to illustrate the types of components that may be present in an electronic device 10.

In addition to an electronic display 12, the electronic device 10 includes one or more input devices 14, one or more input/output (I/O) ports 16, a processor core complex 18 having one or more processors or processor cores and/or image processing circuitry, memory 20, one or more storage devices 22, a network interface 24, and image processing circuitry 26. The various components described in FIG. 1 may include hardware elements (e.g., circuitry), software elements (e.g., a tangible, non-transitory computer-readable medium storing instructions), or a combination of both hardware and software elements. The various components may be combined into fewer components or separated into additional components. For example, the memory 20 and the storage devices 22 may be included in a single component. In another example, the image processing circuitry 26 may be a component of the processor core complex 18, a separate module, or a component of the electronic display 12.

The processor core complex 18 is operably coupled with the memory 20 and the storage device 22. As such, the processor core complex 18 may execute instructions stored in memory 20 and/or a storage device 22 to perform operations, such as generating or processing video data. The processor core complex 18 may include one or more microprocessors, one or more application specific processors (ASICs), one or more field programmable logic arrays (FPGAs), or any combination thereof.

In addition to instructions, the memory 20 and/or the storage device 22 may store data, such as video data. Thus, the memory 20 and/or the storage device 22 may include one or more tangible, non-transitory, computer-readable media that store instructions executable by processing circuitry, such as the processor core complex 18, and/or data to be processed by the processing circuitry. For example, the memory 20 may include random access memory (RAM) and the storage device 22 may include read only memory (ROM), rewritable non-volatile memory, such as flash memory, hard drives, optical discs, and/or the like.

The network interface 24 may enable the electronic device 10 to communicate with a communication network and/or another electronic device 10. For example, the network interface 24 may connect the electronic device 10 to a personal area network (PAN), such as a Bluetooth network, a local area network (LAN), such as an 802.11x Wi-Fi network, and/or a wide area network (WAN), such as a 4G, LTE, or 5G cellular network. In other words, the network interface 24 may enable the electronic device 10 to transmit data (e.g., video data) to a communication network and/or receive data from the communication network.

A power source 25 may provide electrical power to operate the processor core complex 18 and/or other components in the electronic device 10, for example, via one or more power supply rails. Thus, the power source 25 may include any suitable source of electrical power, such as a rechargeable lithium polymer (Li-poly) battery and/or an alternating current (AC) power converter. A power management integrated circuit (PMIC) may control the provision and generation of electrical power to the various components of the electronic device 10.

The I/O ports 16 may enable the electronic device 10 to interface with another electronic device 10. For example, a portable storage device may be connected to an I/O port 16, thereby enabling the electronic device 10 to communicate data, such as video data, with the portable storage device. The input devices 14 may enable a user to interact with the electronic device 10. For example, the input devices 14 may include one or more buttons, one or more keyboards, one or more mice, one or more trackpads, and/or the like. Additionally, the input devices 14 may include touch sensing components implemented in the electronic display 12. The touch sensing components may receive user inputs by detecting occurrence and/or position of an object contacting the display surface of the electronic display 12.

In addition to enabling user inputs, the electronic display 12 may display images. For example, the electronic display 12 may display a graphical user interface (GUI) 32 of an operating system, an application interface, text, a still image, or video content. The electronic display 12 may display an image by controlling the luminance of various display pixels based at least in part image data associated with corresponding image pixels in image data. The image data may be generated by an image source, such as the processor core complex 18, a graphics processing unit (GPU), an image sensor, and/or memory 20 or storage 22. Image data may also be received from another electronic device 10 via the network interface 24 and/or an I/O port 16.

Figure 2:
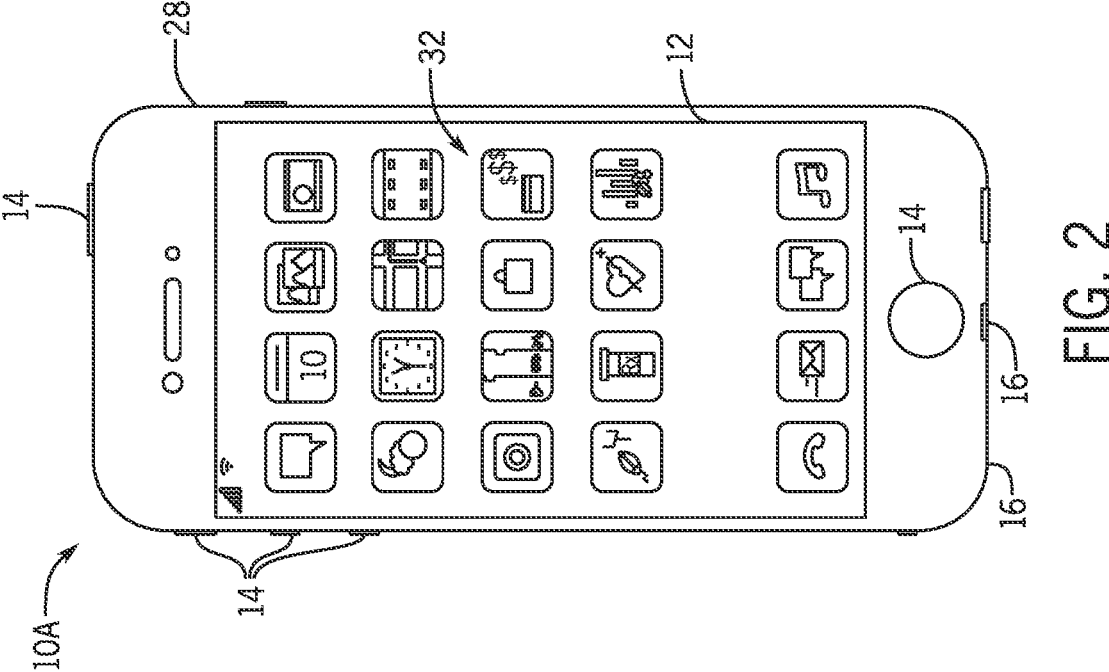
FIG. 2 is a front view of a mobile phone representing an example of the electronic device of FIG. 1, in accordance with an embodiment.

One example of the electronic device 10, specifically a handheld device 10A, is shown in FIG. 2. The handheld device 10A may be a portable phone, a media player, a personal data organizer, a handheld game platform, and/or the like. For example, the handheld device 10A may be a smart phone, such as any iPhone® model available from Apple Inc.

The handheld device 10A includes an enclosure 28 (e.g., housing). The enclosure 28 may protect interior components from physical damage and/or shield them from electromagnetic interference. In the depicted embodiment, the electronic display 12 is displaying a graphical user interface (GUI) having an array of icons. By way of example, when an icon is selected either by an input device 14 or a touch sensing component of the electronic display 12, an application program may launch.

Input devices 14 may be provided through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 also open through the enclosure 28. The I/O ports 16 may include, for example, a Lightning® or Universal Serial Bus (USB) port.

Figure 3:
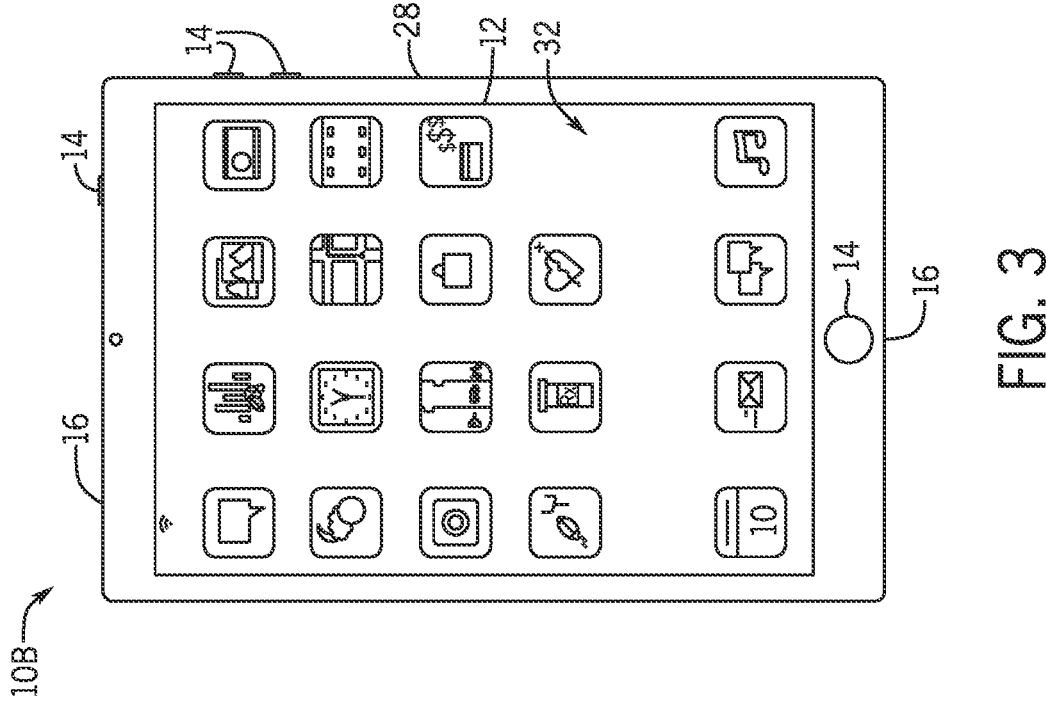
FIG. 3 is a front view of a tablet device representing an example of the electronic device of FIG. 1, in accordance with an embodiment.
Figure 4:
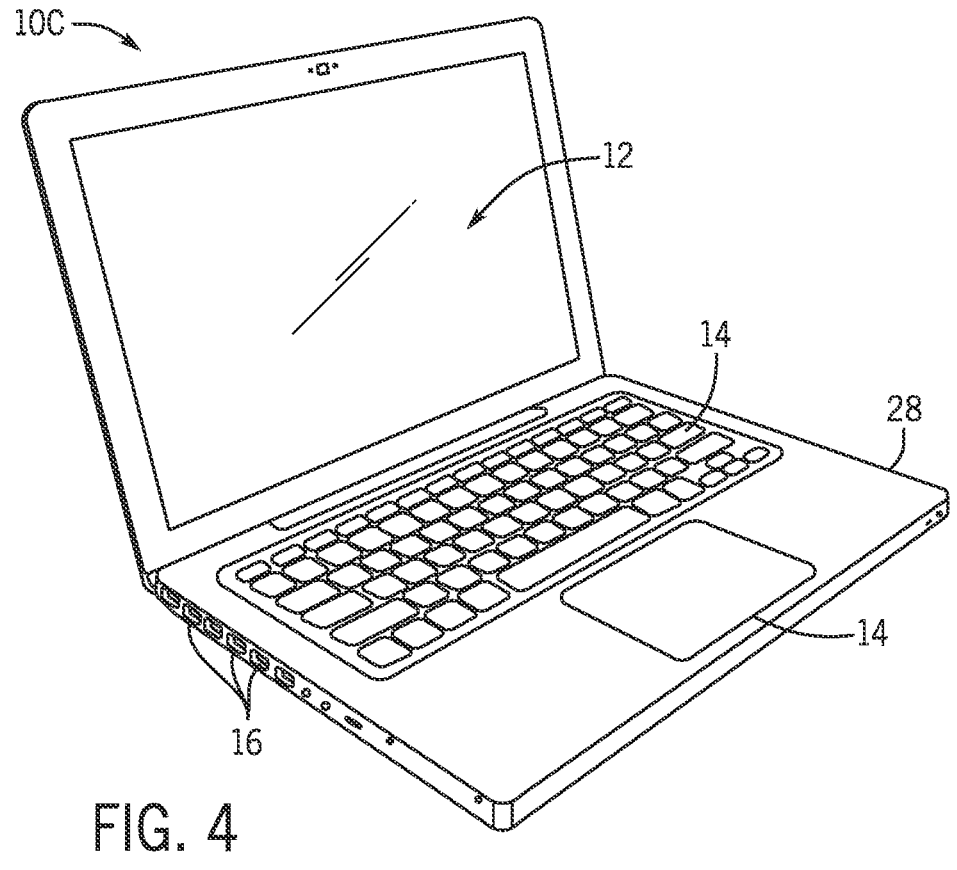
FIG. 4 is a front view of a notebook computer representing an example of the electronic device of FIG. 1, in accordance with an embodiment.
Figure 5:
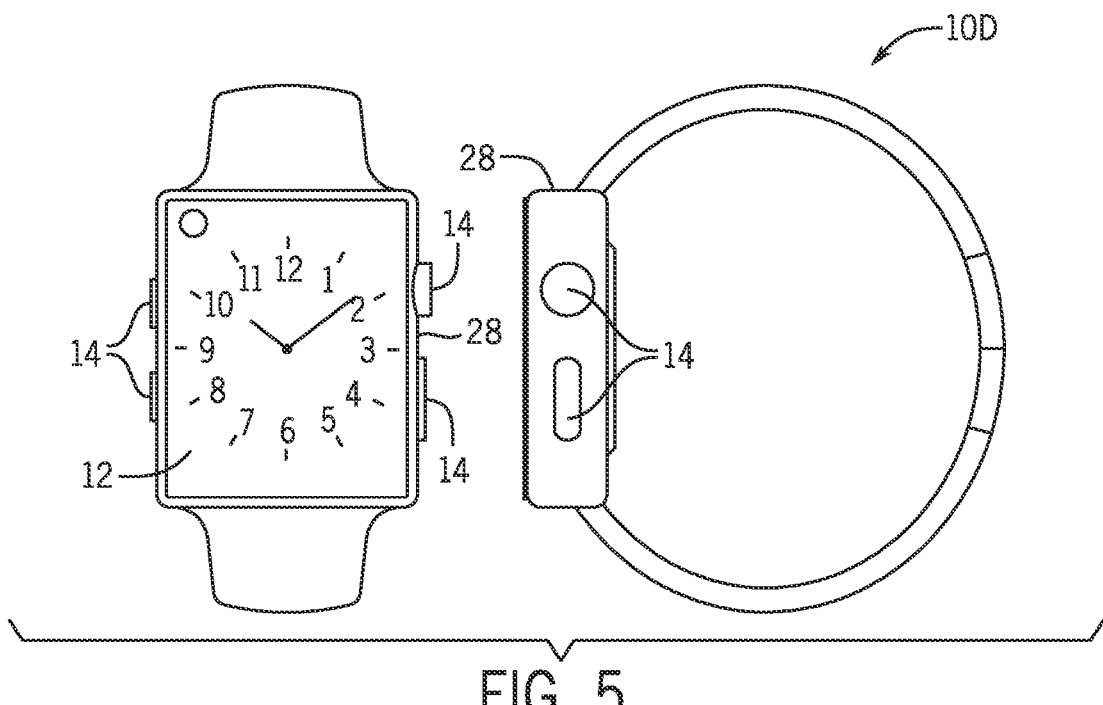
FIG. 5 shows front and side views of a watch representing an example of the electronic device of FIG. 1, in accordance with an embodiment.

The electronic device 10 may take the form of a tablet device 10B, as shown in FIG. 3. By way of example, the tablet device 10B may be any iPad® model available from Apple Inc. A further example of a suitable electronic device 10, specifically a computer 10C, is shown in FIG. 4. By way of example, the computer 10C may be any MacBook® or iMac® model available from Apple Inc. Another example of a suitable electronic device 10, specifically a watch 10D, is shown in FIG. 5. By way of example, the watch 10D may be any Apple Watch® model available from Apple Inc. As depicted, the tablet device 10B, the computer 10C, and the watch 10D all include respective electronic displays 12, input devices 14, I/O ports 16, and enclosures 28.

Images displayed on the electronic display 12 may initially take the form of an encoded stream of video data. The encoded stream of video data may first be decoded before it can be displayed. Encoded video data may correspond to High Dynamic Range (HDR) content, and video decoder circuitry may function to reconstruct image frames from an incoming bitstream of HDR video data. The video decoder circuitry may include a loop filters component that may include luma statistics collection circuitry housed within the loop filters. The luma statistics collection circuitry may collect luma statistics from the decoded image frames, and bin the luma statistics to build histogram data. In this way, luma statistics for an image frame may be output along with the decoded image frame to reduce latency and image artifacts in video decoding.

Figure 6:
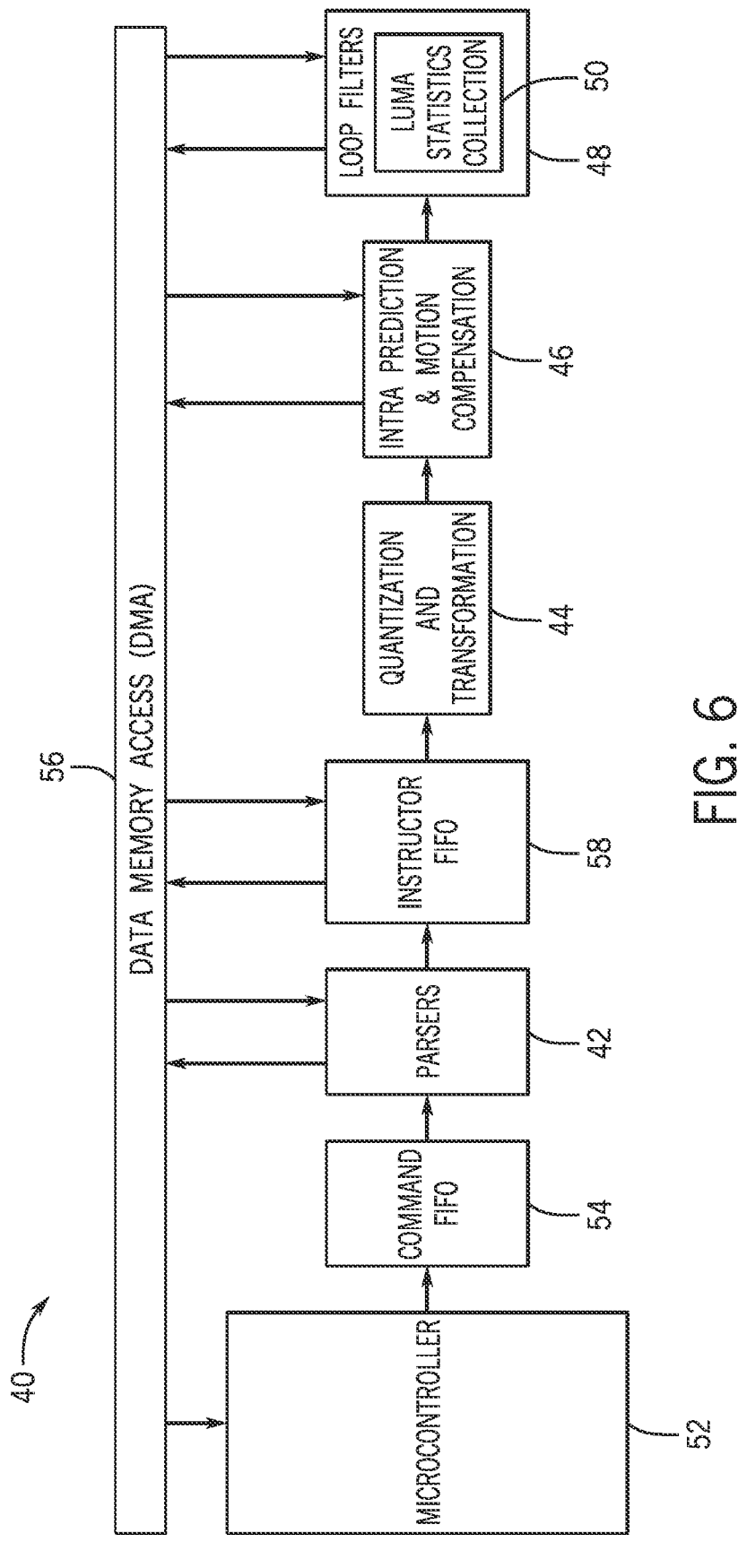
FIG. 6 is a block diagram of video decoder components, in accordance with an embodiment.

With the foregoing in mind, FIG. 6 is a block diagram of a video decoder 40. The video decoder 40 may include multiple parsers 42 that enable parsing of encoded video data (e.g., bitstreams) to obtain syntax elements. The video decoder 40 may determine instructions corresponding to the parsed video data, and send the instructions to a decoder pipeline to aid in decoding the video data. The decoder pipeline may include a quantization and transform component 44, an intra prediction and motion compensation component 46, and a loop filters component 48 which includes luma statistics collection circuitry 50 that may collect luma statistics during image frame decoding.

The video decoder 40 may further include a microcontroller 52, which may be decoupled from the other hardware components of the video decoder 40 by a command first-in first-out (FIFO) 54. The microcontroller 52 may route to a local central processing unit (CPU). The microcontroller 52 may execute firmware that includes hardware units of the video decoder 40, controls scheduling of the bitstream data, and communicates with the main CPU. The microcontroller 52 may receive encoded video data (e.g., bitstreams) that corresponds to a specific compression scheme (e.g., AVC, HEVC, VP9, or the like). The microcontroller 52 may send the encoded video data to the command FIFO 54.

A direct memory access (DMA) 56 may be coupled to the microcontroller 52; command FIFO 54; a decoder pipeline that includes a quantization and transform component 44, an intra prediction and motion compensation component 46, and a loop filters component 48 which includes luma statistics collection 50 circuitry that may collect luma statistics during frame decoding. The decoder pipeline will perform video decoding based on the syntax elements extracted by the parsers 42 in accordance with instructions from the command FIFO 54; and a decoding instructions FIFO 58. The DMA 56 may receive or transfer the encoded video data or the parsed video data for loading into the decoder pipeline or any of the command FIFO 54 and decoding instruction FIFO 58.

The loop filters 48 receive data from the intra prediction and motion compensation block 46, and apply deblocking, sample adaptation, or other suitable loop filters to the image data to generate the final image frame. The loop filters 48 may receive pixel data for all pixels in each image frame, and may function to remove block artifacts from the image. The block artifacts may result from the quantization of the pixels blocks (e.g., 8×8 block of pixels, 16×16 block of pixels). The quantization from previous video decoder 40 components may result in loss of information at the edges of the pixel blocks and discontinuities in the pixel blocks received by the loop filters 48. The loop filters 48 function to remove the block artifacts that appear as a result of quantization from the image frame.

The luma statistics collection circuitry 50 housed within the loop filters component 48 may function to collect luma statistics from the pixel blocks decoded by the video decoder 40. The luma statistics collection circuitry 50 functions to receive luma samples, computes a histogram of all the reconstructed luma samples in each image frame processed by the loop filters 48. The loop filters 48 may write the luma statistics collected and analyzed by the luma statistics collection circuitry 50 to a separate memory region (e.g., 512-byte memory region) using a DMA write channel or other suitable communication method. If the sample range of the encoded video data is detected as a video range (e.g., $[16*2^{n-8}, 235*2^{n-8}]$, n=bit depth) the luma statistics collection circuitry 50 may convert the collected luma samples to a full range (e.g., values $[0, 2^{n}-1]$, n=bit depth) that corresponds to the region of interest. The luma statistics collection circuitry 50 may implement multiple equations for the conversion to full range, and use one or more multipliers to convert the luma samples from a video range to a full range. The luma samples may correspond to one or more bit depths (e.g., 8, 9, 10, 11, and 12) that may each involve different conversion methods. The luma statistics collection circuitry 50 may bin the full range samples over the entire region of interest into 128 bins that each contain 32 bits. It should be understood that multiple methods of conversion may be implemented to convert the luma samples from video range to full range. For each method, binning mismatches at each bit width relative to floating-point conversion from video range to full range may occur. It should be understood that the luma statistics collections circuitry 50 may also function to receive chroma samples, and convert the chroma samples using the conversion methods described above.

Figure 7:
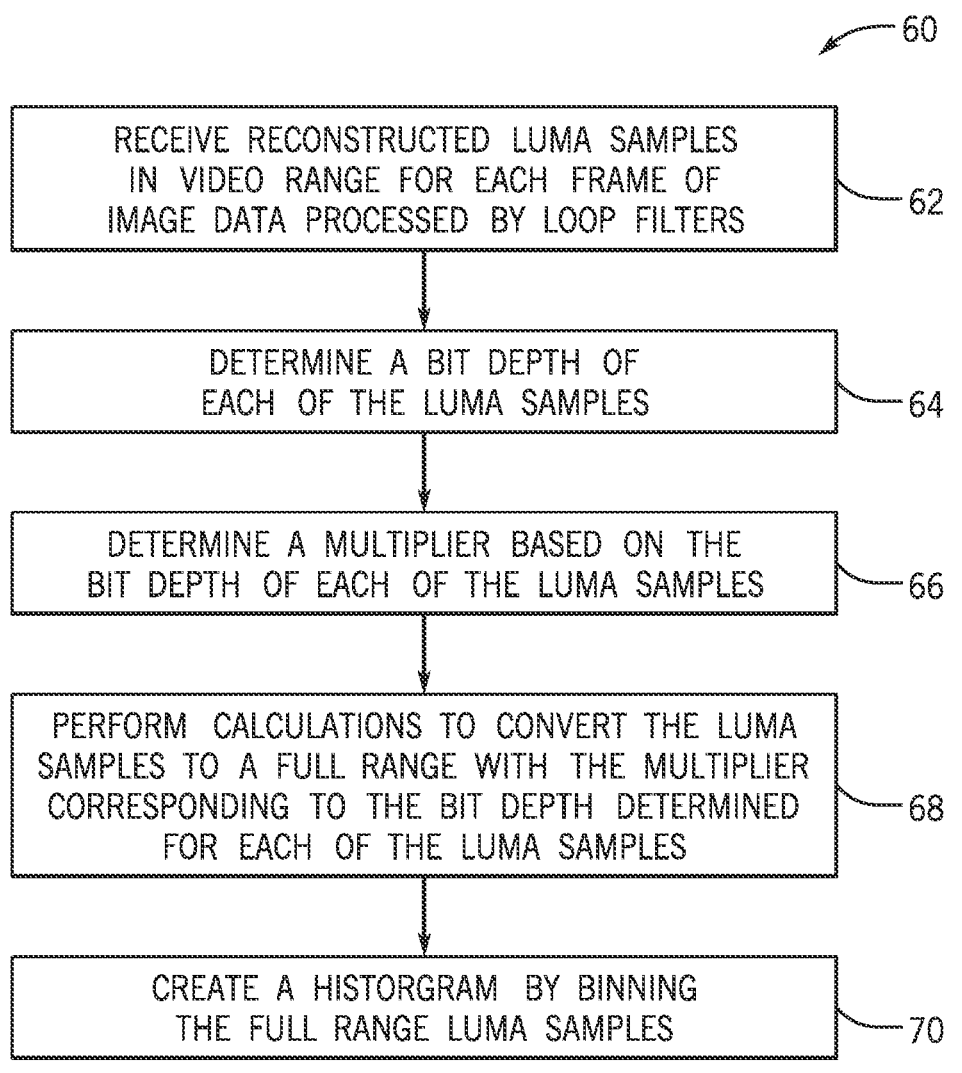
FIG. 7 is a flowchart of a method of luma sample conversion from video range to full range using one multiplier for each luma sample bit depth, in accordance with an embodiment.

With the foregoing in mind, FIG. 7 is a flowchart of a method 60 of luma sample (e.g., collected luma statistics) conversion from video range to full range using one multiplier for each sample bit depth, in accordance with an embodiment. As discussed above, luma statistics collection circuitry 50 housed within the loop filters 48 may function to collect luma samples from the decoded frame output of the loop filters 48. Additionally, the luma statistics collection circuitry 50 may convert the luma samples from a video range to a full range. This may enable a histogram of the full range luma samples to be computed and output. The histogram may be used to correct for image artifacts in the decoded image frames.

The loop filters 48 of the video decoder 40 may receive image frame data and decode the data to reconstruct each image frame. The loop filters 48 may include luma statistic collection circuitry 50 that functions to collect luma samples from reconstructed frame data. Any suitable device (e.g., the microcontroller 52) that may control components of the electronic device 10, such as the processor 18 (e.g., processor core complex 18), may perform the method 60. In some embodiments, the method 60 may be implemented by executing instructions stored in a tangible, non-transitory, computer-readable medium, such as the memory (e.g., DMA 56), using the processor core complex 18 and/or using the microcontroller 52 of the video decoder 40 which includes one or more processors and a memory. For example, the method 60 may be performed at least in part by one or more software components, such as an operating system of the electronic device 10, one or more software applications of the electronic device 10, and the like. While the method 60 is described using steps in a specific sequence, it should be understood that the present disclosure contemplates that the described steps may be performed in different sequences than the sequence illustrated, and certain described steps may be skipped or not performed altogether.

In block 62, the luma statistics collection circuitry 50 may accumulate luma samples from the 16×8 memory tile output of the loop filters 48. The collected luma samples from the memory tile output may be in video range format (e.g., $16*2^{n-8}, 235*2^{n-8}$], n=bit depth) corresponding to one or more bit depths (e.g., n=8, 9, 10, 11, and 12). The collected luma samples may need to be converted to a full range (e.g., $0, 2^{n}-1$], n=bit depth) so that analysis and correction can be performed for the image frames based on the collected luma samples. To perform the conversion, in block 64, the luma statistics collection circuitry 50 may determine the bit depth of each of the luma samples that are collected. The bit depth may impact the multiplier used for the conversion of the collected luma samples from the video range to the full range.

At block 66, the luma statistics collection circuitry 50 may determine a multiplier based on the bit depth of each of the luma samples. The conversion may use one or more equations that implement different multipliers depending on the bit depth (e.g., n=8, 9, 10, 11, 12) of the collected luma samples. The multipliers may be determined using an equation that converts the collected samples to a full range. The multipliers implemented may be referenced as $C_n$=38154 for a bit depth of n=8, $C_n$=38229 for a bit depth of n=9, $C_n$=38267 for a bit depth of n=10, $C_n$=38285 for a bit depth of n=11, and $C_n$=38295 for a bit depth of n=12. The multipliers may be implemented in the equation 1, defined as $Y_{full}=[C_n(Y_{lim}-16*2^{n-8})+2^{14}]>>15$, to convert the video range luma samples (e.g., $Y_{lim}$) to full range luma samples (e.g., $Y_{full}$) based on the bit-depth (e.g., n=8, 9, 10, 11, 12) determined by the luma statistics collection circuitry 50.

The luma statistics collection circuitry 50, at block 68, may use the multiplier corresponding to the identified bit depth at block 66, to calculate the full range luma samples from the video range collected luma samples. The luma statistics collection circuitry 50 may implement the multiplier corresponding to each bit depth of the luma samples, and use the multiplier in the conversion of the luma samples to the full range. The luma statistics collection circuitry 50 may, at block 70, bin the full range samples over the region of interest into 128 bins. The histogram may be used by the video decoder 40 to identify image artifacts in the image frame and apply corrections to the image artifacts that result from the decoded video stream. For example, HDR tone mapping may performed for the image frame based on maximum and minimum values identified from peaks that are present in the histogram.

The binning error rate resulting from the above method relative to a floating-point implementation may be 0% for 8-bit samples, 4.3% for 9-bit samples, 0, 1% for 10-bit samples, 0.1% for 11-bit samples and 0% for 12-bit samples. The method uses 5 multipliers according to the variable bit depths of the luma samples. It should be understood, although one method of conversion from video range to full range is described above multiple conversion methods and algorithms may be implemented by the luma statistics collection circuitry 50. Further, the same conversion methods may be applied to collected chroma samples of the image frame to correct the image frame based on histogram data determined from the chroma samples.

As discussed above, the luma samples may be converted from a video range (e.g., $16*2^{n-8}$, $235*2^{n-8}$], n=bit depth) to a full range (e.g., 0, $2^n-1$], n=bit depth). The luma samples may be binned over the full range, and a histogram can be created for the full video range. Tone mapping may be applied to the full range luma samples, based on analysis of the histogram. The conversion of the video range luma samples output from the loop filters 48 may use one or more multipliers and equations for conversion.

Figure 8:
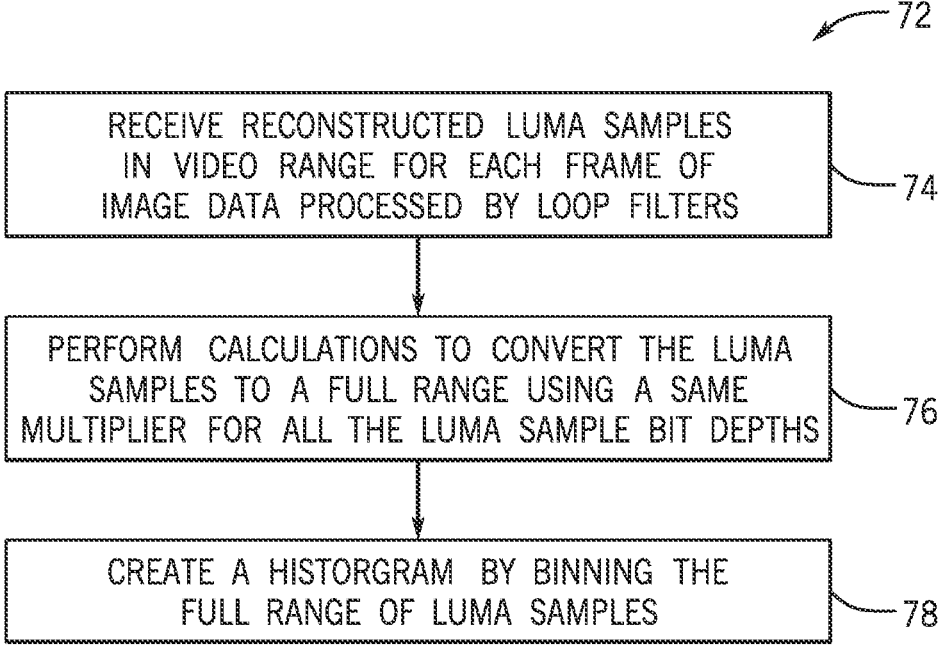
FIG. 8 is a is a flowchart of a method of luma sample conversion from video range to full range using a single multiplier for each luma sample bit depth.

With the foregoing in mind, FIG. 8 is a flowchart of a method 72 of luma sample conversion from video range to full range using a single multiplier for each sample bit depth, in accordance with an embodiment. As discussed above, luma statistics collection circuitry 50 housed within the loop filters 48 may function to collect luma samples from the decoded frame output of the loop filters 48. Additionally, the luma statistics collection circuitry 50 may convert the luma samples to a full range so that a histogram of the luma samples can be computed, and analyzed to correct for image artifacts in the decoded image frames.

The loop filters 48 of the video decoder 40 may receive image frame data and decode the data to reconstruct each image frame. The loop filters 48 may include luma statistic collection hardware 50 that functions to collect luma samples from reconstructed frame data. Any suitable device (e.g., the microcontroller 52) that may control components of the electronic device 10, such as the processor 18 (e.g., processor core complex 18), may perform the method 72. In some embodiments, the method 72 may be implemented by executing instructions stored in a tangible, non-transitory, computer-readable medium, such as the memory (e.g., DMA 56), using the processor core complex 18 and/or using the microcontroller 52 of the video decoder 40 which includes one or more processors and a memory. For example, the method 72 may be performed at least in part by one or more software components, such as an operating system of the electronic device 10, one or more software applications of the electronic device 10, and the like. While the method 72 is described using steps in a specific sequence, it should be understood that the present disclosure contemplates that the described steps may be performed in different sequences than the sequence illustrated, and certain described steps may be skipped or not performed altogether.

In block 74, the luma statistics collection circuitry 50 may accumulate luma samples from the pixel block output of the loop filters 48. The collected samples from the image frame data may be in a video range sample format (e.g., $16*2^{n-8}$, $235*2^{n-8}$], n=bit depth) corresponding to one or more bit depths (e.g., n=8, 9, 10, 11, 12). The collected samples may need to be converted to full range values (e.g., 0, $2^n$], n=bit depth) so that analysis and correction can be performed for the image frames based on the collected luma statistic data.

At block 76, the luma statistics collection circuitry 50 may perform calculations on all bit depths (e.g., n=8, 9, 10, 11, 12) of the collected luma samples to convert the luma samples from a video range to a full range. The multiplier that was calculated for a bit depth of 10 based on FIG. 7 may be applied for all bit depths in the current method. This is because the primary application of this method is for a bit depth of 10. This approximation of using the multiplier corresponding to a bit depth of 10 for all bit depths, may introduce an error in the multiplier (e.g., $C_n$), as a result of using one multiplier for all sample bit depths. This approximation of using the multiplier corresponding to a bit depth of 10 for all bit depths, may introduce an error in the multiplier (e.g., $C_n$) denoted by the equation $\epsilon_n=C_{10}-C_n$. The error can be further calculated by substituting $C_{10}$ instead of the bit depth specific multiplier, $C_n$, of equation 1. For example, $Y'_f$ may be utilized to denote full range samples converted using $C_{10}$, and the term $Y_d$ may be introduced for $Y_{lim}-16*2^{n-8}$ term of the equation of FIG. 7. The error can be calculated according to the equation $$Y'_f = \left[\frac{C_{10Y_d+2^{14}}}{2^{15}} + \delta n\right], \text{ where } = \frac{\epsilon n Y_d}{2^{15}}.$$

The error can be further calculated by substituting $C_{10}$ instead of the bit depth specific multiplier, $C_1$, into the conversion examples. For example, $Y'_f$ may be used to denote full range samples converted using $C_{10}$, and the error can be calculated according to the conversion equation from video-range to full range.

When samples correspond to a bit depth of 8, the sample range may be calculated as $0 \leq \delta_8 \leq 0.76$. Each bin may have a width of two samples for a bit depth of 8, in some cases where $Y_{lim}=235$ a sample may be incorrectly assigned to the bin that is to the right of the correct bin. Because 0.76<2, the sample will not be incorrectly assigned to the bin that is two bins right of the correct bin.

Similarly, for n=12 the range may be calculated as $-2.99 \leq \delta_{12} \leq 0$. For a bit depth of 12 each bin may have a width of 32 samples. For a bit depth of 12 when $Y_{lim}=235*2^4$, a sample may be incorrectly assigned to the bin that is left of the correct bin. Because 2.99<3 the sample should not be assigned to two bins left of the correct bin. All luma samples within a frame may have uniformly-distributed luma intensities over the video range. This may result in a uniform error distribution that varies linearly from 0 at $Y_{lim}=16*2^{n-8}$ to the maximum error at $Y_{lim}=235*2^{n-8}$ for the video range.

By using the sample multiplier corresponding to a bit depth of 10 for all luma sample bit depths binning errors resulting from the above method may be 19% for 8-bit samples, 4.3% for 9-bit samples, 0.1% for 10-bit samples, 3.1% for 11-bit samples and 4.7% for 12-bit samples. The method uses one multiplier for all the variable bit depths of the luma samples. Further, the same conversion methods may be applied to collected chroma samples of the image frame to correct the image frame based on histograms determined from the chroma samples.

The luma statistics collection circuitry 50, at block 78, may create a histogram using the full range of luma samples from the resulting calculations performed in block 74. The luma statistics collection circuitry 50 may bin the full range luma samples over the region of interest into the corresponding 128 bins. The histogram data may be used by the video decoder 40 to identify image artifacts in the image frame, and apply corrections to the image artifacts that result from the decoded video stream. For example, HDR tone mapping may performed for the image frame based on maximum and minimum values identified in the histogram. It should be understood, although one method of conversion from video range to full range is described above multiple conversion methods and algorithms may be implemented by the luma statistics collection circuitry 50.

With the foregoing in mind, FIG. 9 is a flowchart of a method 80 of luma sample conversion from video range to full range by scaling the input samples to a bit depth of 10 bits, in accordance with an embodiment. As discussed above, luma statistics collection circuitry 50 housed within the loop filters 48 may function to collect luma samples from the decoded frame output of the loop filters. Additionally, the luma statistics collection circuitry 50 may convert the luma samples to a full range so that a histogram of the luma samples can be computed, and applied to correct for image artifacts in the decoded image frames.

The loop filters 48 of the video decoder circuitry 40 may receive image frame data and decode the data to reconstruct each image frame. The loop filters 48 may include luma statistic collection circuitry 50 that functions to collect luma statistics from reconstructed frame data. Any suitable device (e.g., the microcontroller 52) that may control components of the electronic device 10, such as the processor 18 (e.g., processor core complex 18), may perform the method 80. In some embodiments, the method 80 may be implemented by executing instructions stored in a tangible, non-transitory, computer-readable medium, such as the memory (e.g., DMA 56), using the processor core complex 18 and/or using the microcontroller 52 of the video decoder 40 which includes one or more processors and a memory. For example, the method 80 may be performed at least in part by one or more software components, such as an operating system of the electronic device 10, one or more software applications of the electronic device 10, software or firmware running on processing circuitry associated with the video decoder 40, or the like. While the method 80 is described using steps in a specific sequence, it should be understood that the present disclosure contemplates that the described steps may be performed in different sequences than the sequence illustrated, and certain described steps may be skipped or not performed altogether.

In block 82, the luma statistics collection circuitry 50 may accumulate luma samples from the pixel block output of the loop filters. The collected samples from the image frame data may be in a video range format corresponding to one or more bit depths, and may need to be converted to the full range (e.g., $16*2^{n-8}$, $235*2^{n-8}$], n=bit depth) so that analysis and correction can be performed for the image frames based on the collected luma statistic data. To perform the conversion, the luma statistics collection circuitry 50 may determine the bit depth of the luma samples that are collected, at block 84. The bit depth may impact the conversion and multiplier used for the conversion of the collected luma samples from the video range length to a full range length.

At block 86, the luma statistics collection circuitry 50 may apply algorithms to scale the bit depths (e.g., n=8, 9, 10, 11, 12) of the collected luma samples to 10 bits. The luma statistics collection circuitry 50 may use a modified form of the conversion equation used in FIG. 7 to perform the calculations to scale the bit depth of the collected luma samples. The luma statistics collection circuitry 50 may utilize a modified form of equation of FIG. 7, $Y_{full}=[2^{15}(2^{n}-$ $1)Y'_d+2^{14}]>>15$ where $Y'_d \in [0,1]$, to perform the calculations demonstrated. The multiplier may be implemented in the equation $$C_n = 2^{15}\left(\frac{1}{219*2^{n-8}}\right)(2^n - 1).$$

Multiple conversion factors may be implemented to scale the inputs. For example, the exponent of a first factor may designate the number of precision bits, a second factor may scale the range of samples $Y_d$ to [0, 1], and the third factor may scale the range of samples from [0, 1] to [0, $2^n-1$] to correspond to a full range of luma sample values.

The luma samples may be scaled according to the above referenced equation so that all samples correspond to 10 bits. For example, to scale luma samples of 12 bits the luma samples may be scaled to a partial range instead of a full range For example, the 12-bit sample data may be converted to the partial range [0, 219*4]. The partial range may be converted to a full range using equation 1 and designating a bit depth of 10 to reduce bin mismatches. This is because using a multiplier corresponding to a bit-depth of 10 scales the range of [0,219*4] to the full range [0, 1023] for 10-bit numbers. For example, the equation $Y_{full}=(C_{10}*Y_d+2^{16})>>17$ scales the 12-bit data and retains two fractional bits and 10 integer bits. This equation reduces the binning mismatches from 4.7% in FIG. 8 to 2.4% for 12-bit data. Other conversion methods may also be implemented that truncate or round the $Y_d$ factor to 10-bits, but involve binning mismatches of 6.1% and 4.3% respectively when utilizing conversion equations $Y_{full}=(C_{10}*Y_{d/4}+2^{14})>>15$ and $Y_{full}=(C_{10}*Y_{d+2/4}+2^{14})>>15$.

Further the samples identified as having a bit-depth of 11 may be scaled to the range [0,219*4], and may utilize the equation of FIG. 7 with a bit-depth of 10, which reduces the bin mismatches because the multiplier corresponding to the bit depth of 10 (e.g., $C_{10}$) and scales the partial range [0,219*4] to a full range [e.g., 0, 1023]. The equation may be implemented to retain one fractional bit and the 10-bit integer as. The equation $Y_{full}=(C_{10}*Y_d+2^{15})>>16$ may be used for scaling of luma samples with a bit-depth of 11-bits to a bit-depth of 10-bits.

For luma samples with a bit-depth of 9-bits a similar process to scale the samples to 10-bits may be applied. Additionally, the bits may have to be left-shifted to scale the 9-bit number to a 10-bit number. For example the 9-bit data may be left shifted to the range [0, 219*4] by utilizing equation of FIG. 7 with n=10. This may reduce the bin mismatches because, as discussed above, the use of the multiplier corresponding to 10-bits (e.g., $C_{10}$) reduces the binning percent error from 4.3% in the previous method demonstrated in FIG. 8 to 3.4%. The equation $Y_{full}=(C_{10}*(Y_d<<1)_+2^{14})>>15$ may be used as described above. For samples of a bit depth of 8, a similar equation may be utilized to left shift the 8-bit data to the range [0, 219*4] by utilizing equation of FIG. 7 with n=10. This results in binning mismatches of 8.2%, utilizing the equation $Y_{full}=(C_{10}*(Y_d<<2)_+2^{14})>>15$.

As detailed above, luma statistics collection circuitry 50, at block 88, may scale the luma samples and use the equations above, to calculate the full range of luma samples from the video range of the collected luma samples. The luma statistics collection circuitry 50 may implement the multiplier corresponding to the bit depth and use the conversion equation to perform the conversion of the samples. The luma statistics collection circuitry 50, at block 90, may bin the full range samples over the region of interest into these 128 bins. Each histogram bin may use 32-bits to create a histogram that is used by video decoder 40 to identify image artifacts in the image frame, and apply corrections to the image artifacts that result from the decoded video stream. For example, HDR tone mapping may performed for the image frame based on maximum and minimum values in the histogram.

As discussed above, binning error rate resulting from the above method may be 8.2% for 8-bit samples, 3.4% for 9-bit samples, 0.1% for 10-bit samples, 1.7% for 11-bit samples and 2.4% for 12-bit samples. The method uses 5 multipliers according to the variable bit-depths of the luma samples. It should be understood, although one method of conversion from video-range to full-range is described above multiple conversion methods and algorithms may be implemented by the microcontroller 52 that includes one or more processors and a memory of the video decoder 40 and/or the processor 18. Further, the same conversion methods may be applied to collected chroma samples from the image frame to correct the image frame based on histograms determined from the chroma samples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:
an electronic display; and
decoder hardware configured to decode image data for display on the electronic display, wherein the decoder hardware comprises quantization and transformation (QT) hardware, loop filter hardware, and intra prediction and motion compensation (IPMC) hardware coupled between the QT hardware and the loop filter hardware, wherein the QT hardware is configured to provide an output directly as an input to the IPMC hardware, wherein the loop filter hardware is configured to perform deblocking of an image frame of the image data and perform same-frame luma statistics collection on the deblocked image frame processed by the loop filter hardware, and wherein the loop filter hardware comprises luma statistics collection circuitry configured to receive a plurality of luma samples resulting from the same-frame luma statistics collection.

2. The electronic device of claim 1, wherein the decoder hardware comprises one or more processors configured to:
write the plurality of luma samples to a memory region using a direct memory access (DMA) write channel at an end of the image frame.

3. The electronic device of claim 1, wherein the luma statistics collection circuitry is configured to convert the plurality of luma samples from a video range to a full range and creates a histogram by binning the plurality of luma samples based on converted full range luma samples.

4. The electronic device of claim 3, wherein the decoder hardware comprises one or more processors configured to:
assign the converted full range luma samples into a plurality of bins, wherein each of the plurality of bins holds at least 32-bits.

5. The electronic device of claim 3, the decoder hardware comprises one or more processors configured to:
utilize the histogram to correct for image artifacts in the image frame corresponding to the plurality of luma samples.

6. The electronic device of claim 3, wherein the luma statistics collection circuitry is configured to convert the plurality of luma samples from the video range to the full range by determining a bit depth of each of the plurality of luma samples.

7. The electronic device of claim 6, wherein the luma statistics collection circuitry is configured to convert the plurality of luma samples from the video range to the full range by identifying a multiplier for each of the plurality of luma samples based on the determined bit depth of each of the plurality of luma samples.

8. The electronic device of claim 1, wherein the decoder hardware comprises one or more processors configured to:
scale one or more luma samples of the plurality of luma samples to a same bit depth.

9. The electronic device of claim 8, wherein the luma statistics collection circuitry is configured to convert the plurality of luma samples from a video range to a full range by implementing a same multiplier for the scaled one or more luma samples.

10. An electronic device comprising:
one or more processors and decoder hardware, wherein the decoder hardware is configured to:
receive a plurality of luma samples resulting from loop filters hardware deblocking one or more image frames, wherein the loop filters hardware comprises luma statistics collection circuitry configured to receive the plurality of luma samples, wherein the plurality of luma samples correspond to the same one or more deblocked image frames the loop filters hardware has performed deblocking on, and wherein the one or more image frames each comprise a Region of Interest;
scale the plurality of luma samples to a same bit depth;
convert the plurality of luma samples from a video range to a full range corresponding to the Region of Interest using a single multiplier for all the scaled plurality of luma samples; and
create a histogram by binning the scaled plurality of luma samples based on the converted full range luma samples.

11. The electronic device of claim 10, wherein the decoder hardware is configured to convert the plurality of luma samples from the video range to the full range by determining a bit depth of each of the plurality of luma samples.

12. The electronic device of claim 10, wherein the histogram is used to correct for image artifacts in the one or more image frames corresponding to the one or more image frames that the plurality of luma samples were collected from.

13. The electronic device of claim 10, wherein the decoder hardware is configured to:

arrange the converted full range luma samples into a plurality of bins, wherein each of the plurality of bins holds at least 32 bits.

14. The electronic device of claim 10, wherein the decoder hardware is configured to:

write the converted full range luma samples to a memory region using a direct memory access (DMA) write channel at an end of each image frame of the one or more image frames.

15. The electronic device of claim 10, wherein the decoder hardware is configured to scale the plurality of luma samples based on a number of precision bits, a first range of samples, and a second range of samples.

16. A tangible, non-transitory, machine-readable medium comprising instructions that, when executed by processing circuitry, causes the processing circuitry to perform operations comprising:

deblocking, using a loop filter comprising luma statistics collection circuitry, one or more image frames, wherein the one or more image frames each comprise a Region of Interest;

obtaining a plurality of luma samples, a plurality of chroma samples, or both at the luma statistics collection circuitry that results from the loop filter deblocking the one or more image frames, wherein the plurality of luma samples, the plurality of chroma samples, or both correspond to the same one or more deblocked image frames that the loop filter has performed deblocking on;

converting the plurality of luma samples, the plurality of chroma samples, or both from a video range to a full range corresponding to the Region of Interest; and creating a histogram by binning the plurality of luma samples, the plurality of chroma samples, or both based on the converted full range luma samples, chroma samples, or both.

17. The tangible, non-transitory, machine-readable medium of claim 16, wherein the operations comprise determining a bit depth of each of the plurality of luma samples, the plurality of chroma samples, or both.

18. The tangible, non-transitory, machine-readable medium of claim 17, wherein the operations comprise identifying a multiplier for each of the plurality of luma samples, the plurality of chroma samples, or both based on the determined bit depth of each of the plurality of luma samples, the plurality of chroma samples, or both.

19. The tangible, non-transitory, machine-readable medium of claim 18, wherein the operations comprise converting the plurality of luma samples, the plurality of chroma samples, or both from the video range to the full range based on the identified multiplier for each of the plurality of luma samples, the plurality of chroma samples, or both.

20. The tangible, non-transitory, machine-readable medium of claim 17, wherein the operations comprise correcting for image artifacts based on the histogram in the one or more image frames that the plurality of luma samples, the plurality of chroma samples, or both were collected from.

* * * * *